F. M. Lottridge,
Bale Tie.
No. 97,784.  Patented Dec. 14, 1869.
Fig. 1.  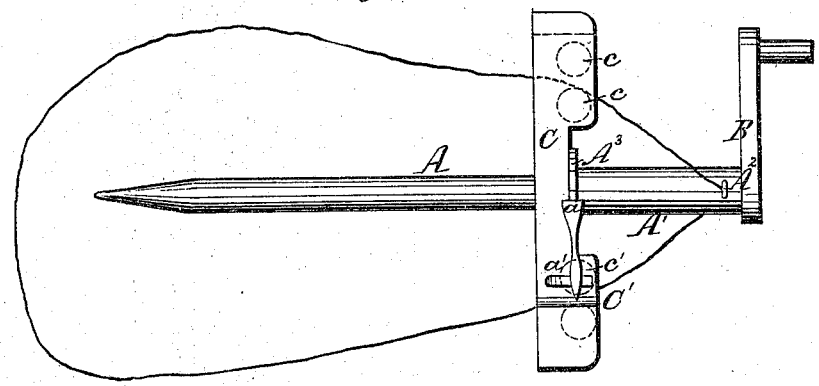    Fig. 2.
Fig. 3.
Witnesses.
Jno. R. Edson
A. Ruppert.
Inventor.
F. M. Lottridge
per D. P. Holloway & Co.
Attys.

United States Patent Office.

FRANCIS M. LOTTRIDGE, OF PORTLAND, INDIANA, ASSIGNOR TO HIMSELF, JAMES N. TEMPLER, AND JAMES C. JAY.

Letters Patent No. 97,784, dated December 14, 1869; antedated November 30, 1869.

IMPROVEMENT IN BAND-TIGHTENERS.

The Schedule referred to in these Letters Patent and making part of the same.

*To all whom it may concern:*

Be it known that I, FRANCIS M. LOTTRIDGE, of Portland, in the county of Jay, and State of Indiana, have invented an Improved Band-Tightener for shocks of corn and other shocks and bundles of grain, and other substances and things; and I do hereby declare that the following is a full, clear, and exact description thereof, reference being had to the accompanying drawings, and to the letters of reference marked thereon.

Figure 1 represents a plan view of the tool;

Figure 2, a section through the enlarged end of the shaft; and

Figure 3, the same, showing the hook over which the looped end of the band is hooked.

Like letters denote like parts in the several figures of the drawings.

My invention relates to an improvement in band-tighteners, which consists mainly in the feature, that in tightening, both ends of the band or rope are wound up, and drawn in at once, and equally, whereby any racking of whatever it binds is prevented. This and other features will be described more fully hereinafter.

To enable those skilled in the art to make and use my invention, I will proceed to describe its construction and operation.

A represents a round shaft, of suitable length, pointed at one end.

A portion, $A^1$, of this shaft, is considerably larger in diameter than the rest, and upon this the rope or band to be used is wound, one end being fastened to it, while the other end is passed around the shock, and attached, by a loop, to a hook, $A^2$, on the enlarged part of the shaft.

$A^3$ represents a ratchet-wheel, which is fastened on the shaft, lying against the shoulder, formed by the enlarged part $A^1$.

A pawl, $a$, which is hinged on the cross-piece C, and acted on by a spring, $a'$, allows the shaft to revolve in one direction only. The pawl may, however, be raised and disengaged from the ratchet-wheel by depressing the end which lies on the spring $a'$.

B represents a crank on the extreme end of $A^1$, by which the shaft is revolved.

C represents a cross-piece or arm, of the form clearly shown in figs. 1 and 2 of the drawings. It is arranged upon the shaft A, its inner side lying against the ratchet-wheel, in such a manner as to revolve freely upon it; but it is prevented from having any longitudinal motion by a pin, which passes through the arm, and lies in a groove on the shaft.

Four pulleys, $c\ c$ and $c'\ c'$, are arranged in pairs in the slots, in each end of the cross-arm between which the rope or band passes.

This device renders the paying out and taking up of the rope or band easy, and without damaging the rope or band.

One end of the cross-arm has, on its upper side, a cut, $C'$, across it, to admit the loose end of the rope or band.

D represents the band or rope to be used. One end of it is fastened in any convenient manner to the enlarged part, $A^1$, of the shaft, as already stated; its other, loose end, is passed through the slot in the cross-arm, between the pulleys $c\ c$, and then provided with a loop.

The operation is as follows:

The pointed end of the shaft is inserted in the shocks of corn, or whatever it is intended to bind. Enough of the band or rope to embrace the shock is payed out, which is done by disengaging the pawl from the ratchet-wheel, and pulling at the loose end of the rope or band; this is then passed around the shock, and through the cut in the other end of the cross-arm, between the pulleys, when the loop is hooked over the hook on the enlarged part of the shaft.

By turning the crank now, both ends of the rope or band will be wound on the enlarged part of the shaft at once and equally, and the shock may be bound to any degree of tightness.

The ratchet-wheel and pawl furnish a means of holding the band or rope at any given tension, any length of time.

The rope or band may be secured around the shock by tying, or in any other convenient manner.

Having thus described my invention,

What I claim, and desire to secure by Letters Patent, is—

1. The combination of shaft $A\ A^1$, hook $A^2$, ratchet-wheel $A^3$, pawl $a$, spring $a'$, crank B, and cross-arm C, with pulleys $c\ c$ and $c'\ c'$, all arranged to operate substantially as described.

2. In combination with the above, the cut $C'$, on the upper side of the cross-arm C, with reference to the band or rope, and the pulleys $c'\ c'$, substantially as shown and described.

In testimony whereof, I have signed my name to this specification, in the presence of two witnesses, who have also subscribed the same as such.

FRANCIS M. LOTTRIDGE.

Witnesses:
NELSON R. MCKEE,
F. SMITH.